United States Patent
McCarthy et al.

(10) Patent No.: US 11,407,170 B2
(45) Date of Patent: Aug. 9, 2022

(54) SYSTEM AND METHODS FOR CONTOUR STITCHING IN ADDITIVE MANUFACTURING SYSTEMS

(71) Applicant: General Electric Company, Schenectady, NY (US)

(72) Inventors: Brian Scott McCarthy, Schenectady, NY (US); John Joseph Madelone, Jr., South Glen Falls, NY (US); Justin John Gambone, Jr., Schenectady, NY (US); Rachel Wyn Levine, Bavaria (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 153 days.

(21) Appl. No.: 16/722,517

(22) Filed: Dec. 20, 2019

(65) Prior Publication Data
US 2021/0187830 A1    Jun. 24, 2021

(51) Int. Cl.
*B29C 64/393* (2017.01)
*B29C 64/153* (2017.01)
(Continued)

(52) U.S. Cl.
CPC .......... *B29C 64/153* (2017.08); *B29C 64/245* (2017.08); *B29C 64/255* (2017.08);
(Continued)

(58) Field of Classification Search
CPC ... B29C 64/153; B29C 64/282; B29C 64/245; B29C 64/255; B29C 64/268;
(Continued)

(56) References Cited

U.S. PATENT DOCUMENTS

| | | |
|---|---|---|
| 7,258,720 B2 | 8/2007 | Fuwa et al. |
| 10,338,569 B2 | 7/2019 | Crear et al. |
| | (Continued) | |

FOREIGN PATENT DOCUMENTS

| | | |
|---|---|---|
| CN | 106400001 A | 2/2017 |
| CN | 106670463 A | 5/2017 |
| WO | 2017143789 A1 | 8/2017 |

OTHER PUBLICATIONS

Derahman et al., "Effects of Process Parameters on Surface Quality of Parts Produced by Selective Laser Melting—ANFIS Modelling", Proceedings of Mechanical Engineering Research, pp. 115-116, May 2018.

(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

An additive manufacturing system includes a first laser device configured to generate a first laser beam and a second laser device configured to generate a second laser beam. The laser scanning devices include a first laser scanning device and a second laser scanning device. The first laser scanning device is configured to selectively direct the first laser beam from the first laser devices across a powder bed along a plurality of first hatching paths and a first contour path along a contour of the solid component. The second laser scanning device is configured to selectively direct the second laser beam from the second laser devices across the powder bed along a plurality of second hatching paths and a second contour path along the contour of the solid component. The first contour path includes a first hook extending into the plurality of second hatching paths.

10 Claims, 9 Drawing Sheets

(51) Int. Cl.
*B29C 64/282* (2017.01)
*B29C 64/245* (2017.01)
*B29C 64/255* (2017.01)
*B29C 64/268* (2017.01)
*B33Y 10/00* (2015.01)
*B33Y 30/00* (2015.01)

(52) U.S. Cl.
CPC .......... *B29C 64/268* (2017.08); *B29C 64/282* (2017.08); *B33Y 10/00* (2014.12); *B33Y 30/00* (2014.12)

(58) Field of Classification Search
CPC ... B29C 64/277; B29C 64/264; B29C 64/273; B29C 64/393; B33Y 10/00; B33Y 30/00; B33Y 50/02
See application file for complete search history.

(56) References Cited

U.S. PATENT DOCUMENTS

2018/0281112 A1\* 10/2018 Roerig ................ B22F 12/00
2019/0232429 A1    8/2019 Buller et al.

OTHER PUBLICATIONS

Payne., "Multiple Beam Laser Diode Additive Manufacturing for Metal Parts", PhD Thesis, University of Cambridge, retrieved from https://doi.org/10.17863/CAM.21469, pp. 1-29, Jul. 20, 2018.

\* cited by examiner

SYSTEM AND METHODS FOR CONTOUR STITCHING IN ADDITIVE MANUFACTURING SYSTEMS

BACKGROUND

The field of the disclosure relates generally to additive manufacturing systems, and more particularly, to systems and methods for contour stitching in additive manufacturing systems.

At least some additive manufacturing systems involve the buildup of a powdered material to make a component. These techniques can produce complex components from powder materials at a reduced cost and with improved manufacturing efficiency. At least some known additive manufacturing systems, such as DMLM systems, fabricate components using a plurality of laser devices, a build platform, a recoater, and a powder material, such as, without limitation, a powdered metal. The laser devices each generate a laser beam that melts the powder material on the build platform in and around the area where the laser beam is incident on the powder material, resulting in a melt pool. The melt pool cools into a consolidated, solid top layer of the component. Multiple portions of the component may be manufactured simultaneously using multiple lasers. As such, multiple lasers reduce manufacturing time and reduce the cost to produce the component.

The laser beams must be aligned during the manufacturing process to ensure that the portions manufactured by each individual laser beam are aligned throughout the manufacturing process. Errors and/or misalignments may develop within the component if the laser beams become misaligned during the manufacturing process. Specifically, the contours, or outer surface, of the component may be misaligned if the laser beams are misaligned. This misalignment may cause steps, or sharp raised portions and/or sharp corners, on the contours of the component that are supposed to be continuous and smooth. Typically, the laser beams are calibrated or aligned before the manufacturing process, and it is assumed that the laser beams remain aligned throughout the process. The laser beams may become misaligned during the manufacturing process, however, causing misalignment of the contours of the component.

BRIEF DESCRIPTION

In one aspect, an additive manufacturing system is provided. The additive manufacturing system includes at least two laser devices and at least two laser scanning devices. The at least two laser devices include a first laser device configured to generate a first laser beam for consolidating a first portion of a solid component and a second laser device configured to generate a second laser beam for consolidating a second portion of the solid component. The at least two laser scanning devices include a first laser scanning device and a second laser scanning device. The first laser scanning device is configured to selectively direct the first laser beam across a powder bed along a plurality of first hatching paths and at least one first contour path that defines a contour of the solid component. The second laser scanning device is configured to selectively direct the second laser beam across the powder bed along a plurality of second hatching paths and at least one second contour path that defines the contour of the solid component. The at least one first contour path includes a first hook extending into the plurality of second hatching paths.

In another aspect, a method for manufacturing a solid component with an additive manufacturing system is provided. The additive manufacturing system including at least two laser devices and at least two laser scanning devices. The at least two laser devices include a first laser device and a second laser device. The at least two laser scanning devices including a first laser scanning device and a second laser scanning device. The method includes generating a first laser beam using the first laser device and a second laser beam using the second laser device. The method also includes selectively directing the first laser beam across a powder bed along a plurality of first hatching paths and at least one first contour path that defines a contour of the solid component using the first laser scanning device. The method further includes selectively directing the second laser beam across the powder bed that defines a plurality of second hatching paths and at least one second contour path along the contour of the solid component using the second laser scanning device. The method also includes consolidating a first portion of the solid component using the first laser beam. The method further includes consolidating a second portion of the solid component using the second laser beam. The method also includes consolidating a first hook that extends into the plurality of second hatching paths from the at least one first contour path.

DRAWINGS

These and other features, aspects, and advantages of the present disclosure will become better understood when the following detailed description is read with reference to the accompanying drawings in which like characters represent like parts throughout the drawings, wherein.

Figure 1:
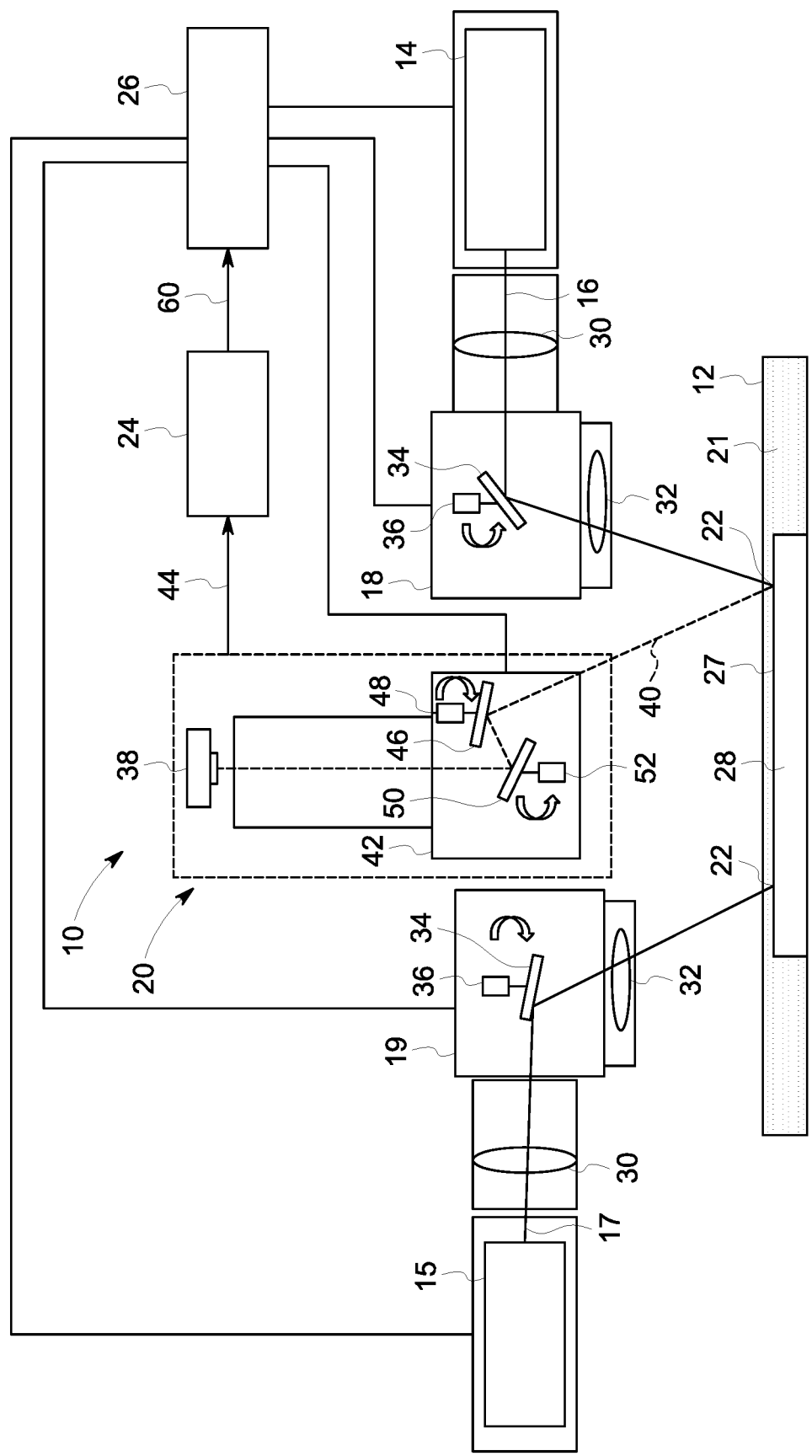
FIG. 1 is a schematic view of an exemplary additive manufacturing system shown in the form of a direct metal laser melting (DMLM) system including multiple lasers and a monitoring system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the additive manufacturing systems described herein utilize hooks at the end of contour paths to reduce the roughness of a contour of a solid component. The additive manufacturing system includes at least two laser devices and at least two laser scanning devices. The laser devices include a first laser device configured to generate a first laser beam and a second laser device configured to generate a second laser beam. The first laser beam is configured to consolidate a first portion of a solid component, and the second laser beam is configured to consolidate a second portion of the solid component. The laser scanning devices include a first laser scanning device and the second laser scanning device. The first laser scanning device is configured to direct the first laser beam from the first laser devices across a powder bed along a plurality of first hatching paths and a first contour path along a contour of the solid component. The second laser scanning device is configured to direct the second laser beam from the second laser device across the powder bed along a plurality of second hatching paths and at least one second contour path along the contour of the solid component. When the scanning devices become misaligned, the first contour path and the second contour path also become misaligned, creating a discontinuity on a surface of the solid component. The discontinuity causes roughness on the surface of the solid component. A hook is added to the end of the first and second contour paths in order to stitch the first and second contour paths together and reduce the roughness cause by misalignment of the scanning devices and/or laser beams. The hooks extend from the end of the contour paths at an angle into the hatching paths to reduce the roughness of the discontinuity. Accordingly, the hooks stitch together misaligned contour paths and reduce the roughness and/or sharpness of the surface of the solid component.

FIG. 1 is a schematic view of an exemplary additive manufacturing system 10 illustrated in the form of a direct metal laser melting (DMLM) system. Although the embodiments herein are described with reference to a DMLM system, this disclosure also applies to other types of additive manufacturing systems, such as selective laser sintering systems.

In the exemplary embodiment, DMLM system 10 includes a build platform 12, a plurality of laser devices 14, 15 configured to generate laser beams 16, 17, a plurality of laser scanning devices 18, 19 configured to selectively direct laser beams 16, 17 across build platform 12, and an optical system 20 for monitoring a melt pool 22 created by laser beams 16, 17. The exemplary DMLM system 10 further includes a computing device 24 and a controller 26 configured to control one or more components of DMLM system 10, as described in more detail herein.

A powdered build material 21 includes materials suitable for forming a solid component 28, including, without limitation, gas atomized alloys of cobalt, iron, aluminum, titanium, nickel, and combinations thereof. In other embodiments, powdered build material 21 includes any suitable type of powdered build material. In yet other embodiments, powdered build material 21 includes any suitable build material that enables DMLM system 10 to function as described, including, for example and without limitation, ceramic powders, metal-coated ceramic powders, and thermoset or thermoplastic resins. Powdered build material 21 is spread across build platform 12 to form a powdered bed 27. Powdered build material 21 within powdered bed 27 is then melted and re-solidified during the additive manufacturing process to build a solid component 28 on build platform 12.

As shown in FIG. 1, each laser device 14, 15 is configured to generate a laser beam 16, 17 of sufficient energy to at least partially melt powdered build material 21 of build platform 12. In the exemplary embodiment, laser devices 14, 15 are a yttrium-based solid state laser configured to emit a laser beam having a wavelength of about 1070 nanometers (nm). In other embodiments, laser devices 14, 15 includes any suitable type of laser that enables DMLM system 10 to function as described herein, such as a carbon dioxide laser. Further, although DMLM system 10 is shown and described as including two laser devices 14, 15, DMLM system 10 may include any combination of laser devices that enable DMLM system 10 to function as described herein including, without limitation, two, three, four, or more laser devices. In one embodiment, for example, DMLM system 10 includes a first laser device 14 having a first power and a second laser device 15 having a second power different from the first laser power, or at least two laser devices having substantially the same power output. In yet other embodiments, DMLM system 10 includes three laser devices. In yet other embodiments, DMLM system 10 includes four laser devices.

Laser devices 14, 15 are optically coupled to optical elements 30 and 32 that facilitate focusing laser beams 16, 17 on build platform 12. In the exemplary embodiment, optical elements 30 and 32 include a beam collimator 30 disposed between laser devices 14, 15 and laser scanning devices 18, 19, and an F-theta lens 32 disposed between the laser scanning devices 18, 19 and build platform 12. In other embodiments, DMLM system 10 includes any suitable type and arrangement of optical elements that provide a collimated and/or focused laser beam on build platform 12.

Laser scanning devices 18, 19 are configured to direct laser beams 16, 17 across selective portions of build platform 12 to create solid component 28. In the exemplary embodiment, laser scanning devices 18, 19 are galvanometer scanning devices including a mirror 34 operatively coupled to a galvanometer-controlled motor 36 (broadly, an actuator). Motor 36 is configured to move (specifically, rotate) mirror 34 in response to signals received from controller 26, and thereby deflect laser beams 16, 17 across selective portions of build platform 12. Mirror 34 includes any suitable configuration that enables mirror 34 to deflect laser beams 16, 17 towards build platform 12. In some embodiments, mirror 34 includes a reflective coating that has a reflectance spectrum that corresponds to the wavelength of laser beams 16, 17.

Although laser scanning devices 18, 19 are illustrated with a single mirror 34 and a single motor 36, laser scanning devices 18, 19 include any suitable number of mirrors and motors that enable laser scanning devices 18, 19 to function as described herein. In one embodiment, for example, laser scanning devices 18, 19 include two mirrors and two galvanometer-controlled motors, each operatively coupled to one of the mirrors. In yet other embodiments, laser scanning devices 18, 19 include any suitable scanning device that enables DMLM system 10 to function as described herein, such as, for example, two-dimension (2D) scan galvanometers, three-dimension (3D) scan galvanometers, and dynamic focusing galvanometers.

Optical system 20 is configured to detect electromagnetic radiation generated by melt pool 22 and transmit information about melt pool 22 to computing device 24. Specifically, optical system 20 detects the location of laser beams 16, 17 in melt pool 22. In the exemplary embodiment, optical system 20 includes a first optical detector 38 configured to detect electromagnetic radiation 40 (also referred to as "EM radiation") generated by melt pool 22, and an optical scanning device 42 configured to direct EM radiation 40 to first optical detector 38. More specifically, first optical detector 38 is configured to receive EM radiation 40 generated by melt pool 22, and generate an electrical signal 44 in response thereto. First optical detector 38 is communicatively coupled to computing device 24, and is configured to transmit electrical signal 44 to computing device 24.

First optical detector 38 includes any suitable optical detector that enables optical system 20 to function as described herein, including, for example and without limitation, a photomultiplier tube, a photodiode, an infrared camera, a charged-couple device (CCD) camera, a CMOS camera, a pyrometer, or a high-speed visible-light camera. Although optical system 20 is shown and described as including a single first optical detector 38, optical system 20 includes any suitable number and type of optical detectors that enables DMLM system 10 to function as described herein. In one embodiment, for example, optical system 20 includes a first optical detector configured to detect EM radiation within an infrared spectrum, and a second optical detector configured to detect EM radiation within a visible-light spectrum. In embodiments including more than one optical detector, optical system 20 includes a beam splitter (not shown) configured to divide and deflect EM radiation 40 from melt pool 22 to a corresponding optical detector.

While optical system 20 is described as including "optical" detectors for EM radiation 40 generated by melt pool 22, it should be noted that use of the term "optical" is not to be equated with the term "visible." Rather, optical system 20 is configured to capture a wide spectral range of EM radiation. For example, first optical detector 38 is sensitive to light with wavelengths in the ultraviolet spectrum (about 200-400 nanometers (nm)), the visible spectrum (about 400-700 nm), the near-infrared spectrum (about 700-1,200 nm), and the infrared spectrum (about 1,200-10,000 nm). Further, because the type of EM radiation emitted by melt pool 22 depends on the temperature of melt pool 22, optical system 20 is capable of monitoring and measuring both a size and a temperature of melt pool 22.

Optical scanning device 42 is configured to direct EM radiation 40 generated by melt pool 22 to first optical detector 38. In the exemplary embodiment, optical scanning device 42 is a galvanometer scanning device including a first mirror 46 operatively coupled to a first galvanometer-controlled motor 48 (broadly, an actuator), and a second mirror 50 operatively coupled to a second galvanometer-controlled motor 52 (broadly, an actuator). First motor 48 and second motor 52 are configured to move (specifically, rotate) first mirror 46 and second mirror 50, respectively, in response to signals received from controller 26 to deflect EM radiation 40 from melt pool 22 to first optical detector 38. First mirror 46 and second mirror 50 have any suitable configuration that enables first mirror 46 and second mirror 50 to deflect EM radiation 40 generated by melt pool 22. In some embodiments, one or both of first mirror 46 and second mirror 50 includes a reflective coating that has a reflectance spectrum that corresponds to EM radiation that first optical detector 38 is configured to detect.

Although optical scanning device 42 is illustrated and described as including two mirrors and two motors, optical scanning device 42 may include any suitable number of mirrors and motors that enable optical system 20 to function as described herein. Further, optical scanning device 42 may include any suitable scanning device that enables optical system 20 to function as described herein, such as, for example, two-dimension (2D) scan galvanometers, three-dimension (3D) scan galvanometers, and dynamic focusing galvanometers.

Computing device 24 includes a computer system that includes at least one processor (not shown in FIG. 1) that executes executable instructions to operate DMLM system 10. Computing device 24 includes, for example, a calibration model of DMLM system 10 and an electronic computer build file associated with a component, such as component 28. The calibration model includes, without limitation, an expected or desired melt pool size and temperature under a given set of operating conditions (e.g., a power of laser device 14) of DMLM system 10. The build file includes build parameters that are used to control one or more components of DMLM system 10. Build parameters include, without limitation, a power of laser device 14, a scan speed of laser scanning device 18, a position and orientation of laser scanning device 18 (specifically, mirror 34), a scan speed of optical scanning device 42, and a position and orientation of optical scanning device 42 (specifically, first mirror 46 and second mirror 50). In the exemplary embodiment, computing device 24 and controller 26 are shown as separate devices. In other embodiments, computing device 24 and controller 26 are combined as a single device that operates as both computing device 24 and controller 26 as each are described herein.

In the exemplary embodiment, computing device 24 is also configured to operate at least partially as a data acquisition device and to monitor the operation of DMLM system 10 during fabrication of component 28. In one embodiment, for example, computing device 24 receives and processes electrical signals 44 from first optical detector 38. Computing device 24 stores information associated with component 28 based on electrical signals 44, is the information used to facilitate controlling and refining a build process for DMLM system 10 or for a specific component built by DMLM system 10.

Further, computing device 24 is configured to adjust one or more build parameters in real-time based on electrical signals 44 received from first optical detector 38. For example, as DMLM system 10 builds component 28, computing device 24 processes electrical signals 44 from first optical detector 38 using data processing algorithms to determine the size and location of portions of component 28. Computing device 24 compares the size and location of portions of component 28 to an expected or desired size and location of component 28 based on a calibration model. Computing device 24 generates control signals 60 that are fed back to controller 26 and used to adjust one or more build parameters in real-time to correct discrepancies in the size and location of component 28.

Controller 26 includes any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 includes, for example, a 3D model of component 28 to be fabricated by DMLM system 10. Executable instructions executed by controller 26 include controlling the power output of laser devices 14, 15, controlling a position and scan speed of laser scanning devices 18, 19, and controlling a position and scan speed of optical scanning device 42. Controller 26 is configured to control one or more components of DMLM system 10 based on build parameters associated with a build file stored, for example, within computing device 24. In the exemplary embodiment, controller 26 is configured to control laser scanning device 18, 19 based on a build file associated with a component to be fabricated with DMLM system 10. More specifically, controller 26 is configured to control the position, movement, and scan speed of mirror 34 using motor 36 based upon a predetermined path defined by a build file associated with component 28. Controller 26 is also configured to control other components of DMLM system 10, including, without limitation, laser devices 14, 15. In one embodiment, for example, controller 26 controls the power output of laser devices 14, 15 based on build parameters associated with a build file.

In the exemplary embodiment, controller 26 is also configured to control optical scanning device 42 to direct EM radiation 40 from melt pool 22 to first optical detector 38. Controller 26 is configured to control the position, movement, and scan speed of first mirror 46 and second mirror 50 based on at least one of the position of mirror 34 of laser scanning device 18 and the position of melt pool 22. In one embodiment, for example, the position of mirror 34 at a given time during the build process is determined, using computing device 24 and/or controller 26, based upon a predetermined path of a build file used to control the position of mirror 34. Controller 26 controls the position, movement, and scan speed of first mirror 46 and second mirror 50 based upon the determined position of mirror 34. In another embodiment, laser scanning devices 18, 19 are configured to communicate the position of mirror 34 to controller 26 and/or computing device 24, for example, by outputting position signals to controller 26 and/or computing device 24 that correspond to the position of mirror 34. In yet another embodiment, controller 26 controls the position, movement, and scan speed of first mirror 46 and second mirror 50 based on the position of melt pool 22. The location of melt pool 22 at a given time during the build process is determined, for example, based upon the position of mirror 34.

Figure 2:
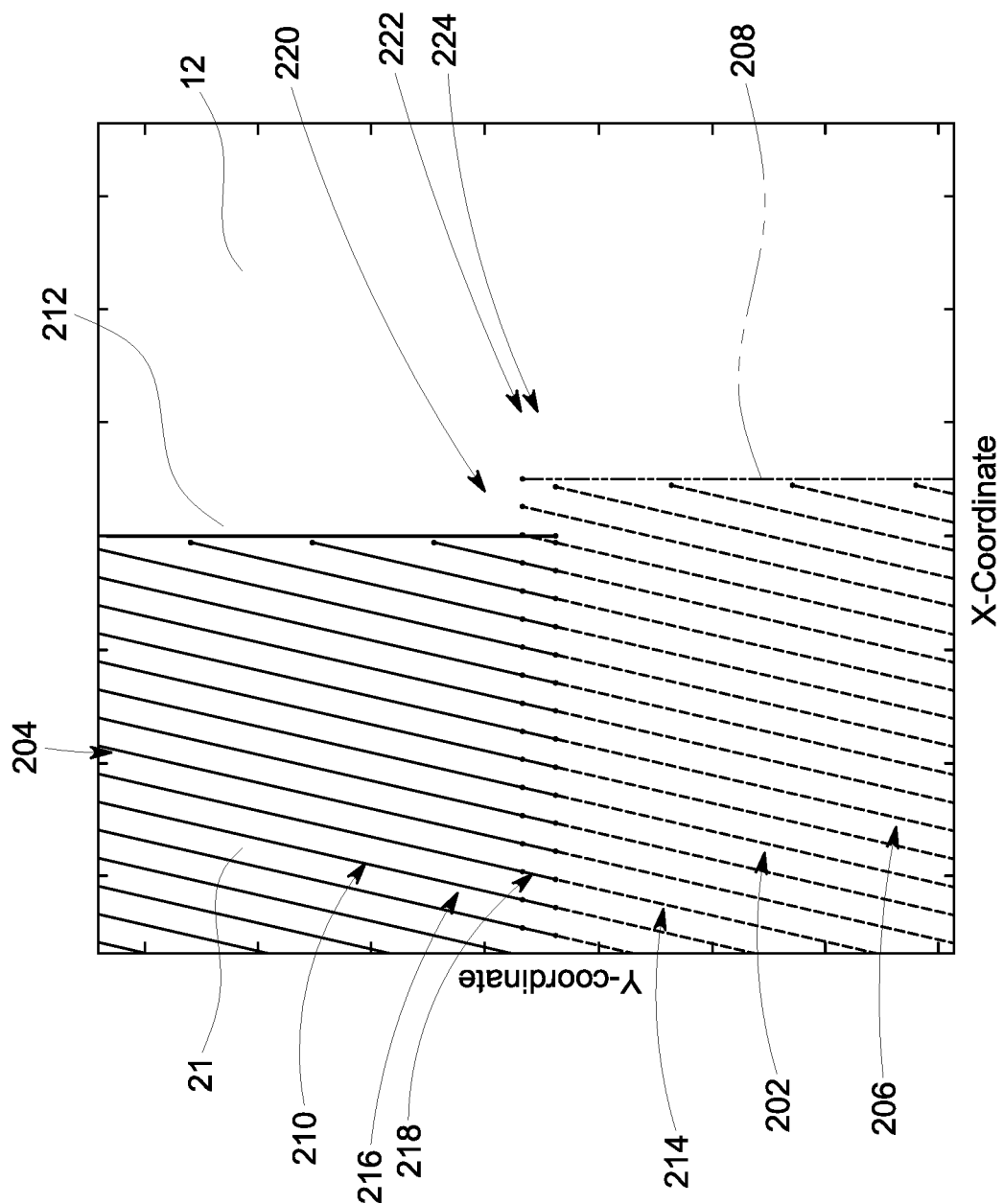
FIG. 2 is a top view of the build platform and the powdered build material shown in FIG. 1 in an x-y coordinate system.

FIG. 2 is a top view of build platform 12 and powdered build material 21 in an x-y coordinate system. Laser scanning device 18 directs a first laser beam 16 across build platform 12 and powdered build material 21 along a first set of laser beam paths 202, and laser scanning device 19 directs a second laser beam 17 across build platform 12 and powdered build material 21 along a second set of laser beam paths 204. First set of laser beam paths 202 includes a plurality of first hatching paths 206 and at least one first contour path 208, and second set of laser beam paths 204 includes a plurality of second hatching paths 210 and at least one second contour path 212. Contour paths 208 and 212 are laser beam paths that follow the contour, or outer surface, of solid component 28 while hatching paths 206 and 210 are laser beam paths within a solid portion of solid component 28. Accordingly, first laser beam 16 consolidates a first portion 214 of solid component 28 while second laser beam 17 consolidates a second portion 216 of solid component 28.

As shown in FIG. 2, first hatching paths 206 and second hatching paths 210 at least partially overlap each other in the y-direction in an overlapping region 218. Additionally, first contour path 208 and second contour path 212 also at least partially overlap each other in the y-direction in overlapping region 218. Overlapping region 218 seamlessly couples first portion 214 of solid component 28 to second portion 216 of solid component 28. As such, overlapping region 218 enables first laser beam 16 to manufacture first portion 214 of solid component 28 and second laser beam 17 to manufacture second portion 216 of solid component 28 at the same time, decreasing manufacturing time and decreasing manufacturing costs. However, as shown in FIG. 2, laser scanning device 18 and laser scanning device 19 are misaligned such that first hatching paths 206 and second hatching paths 210 are misaligned in the x-direction and first contour path 208 and second contour path 212 are also misaligned in the x-direction (i.e., offset from one another). This misalignment creates a step or sharp corner 220, or a sharp raised portion, on a contour 222 of solid component 28 that is supposed to be continuous and smooth.

Figure 3:
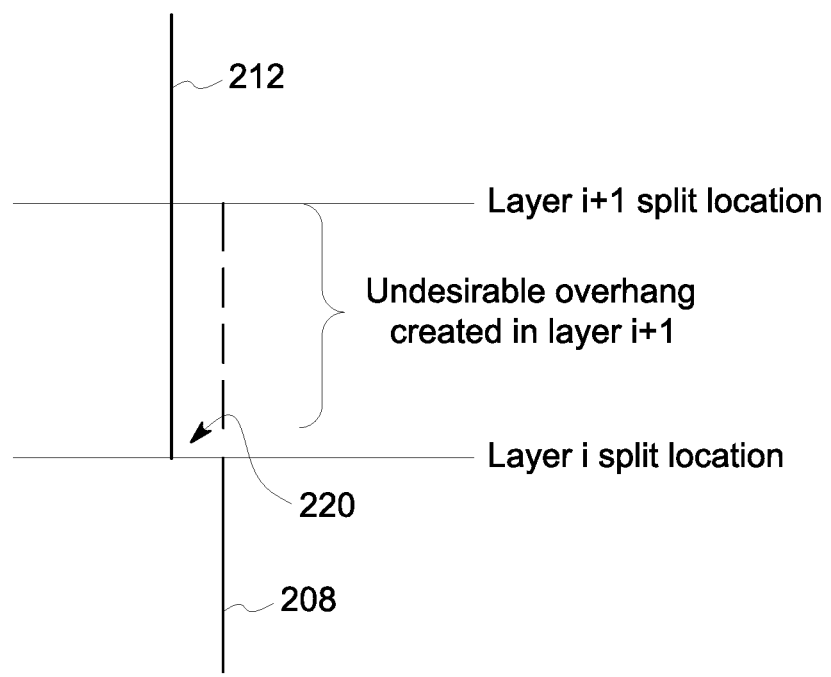
FIG. 3 is a diagram illustrating misalignment between a layer i of powdered build material and a subsequent layer i+1 of powdered build material on the build platform and the powdered build material shown in FIG. 2.

FIG. 3 is a diagram illustrating misalignment between a layer i of powdered build material 21 and a subsequent layer i+1 of powdered build material 21 consolidated on top of layer i. Because the laser scanning devices 18, 19 can become misaligned between consolidation of subsequent layers of powdered build material 21, the location of the misalignment illustrated in FIG. 3 may vary in the z-direction (the direction extending out of the page in FIG. 2) from layer i of powdered build material 21 to layer i+1 of powdered build material 21 and create misalignments in the z-direction as well as the x-y directions. For example, laser scanning devices 18, 19 may be misaligned such that layer i of powdered build material 21 includes step 220 in the z-direction.

Figure 4:
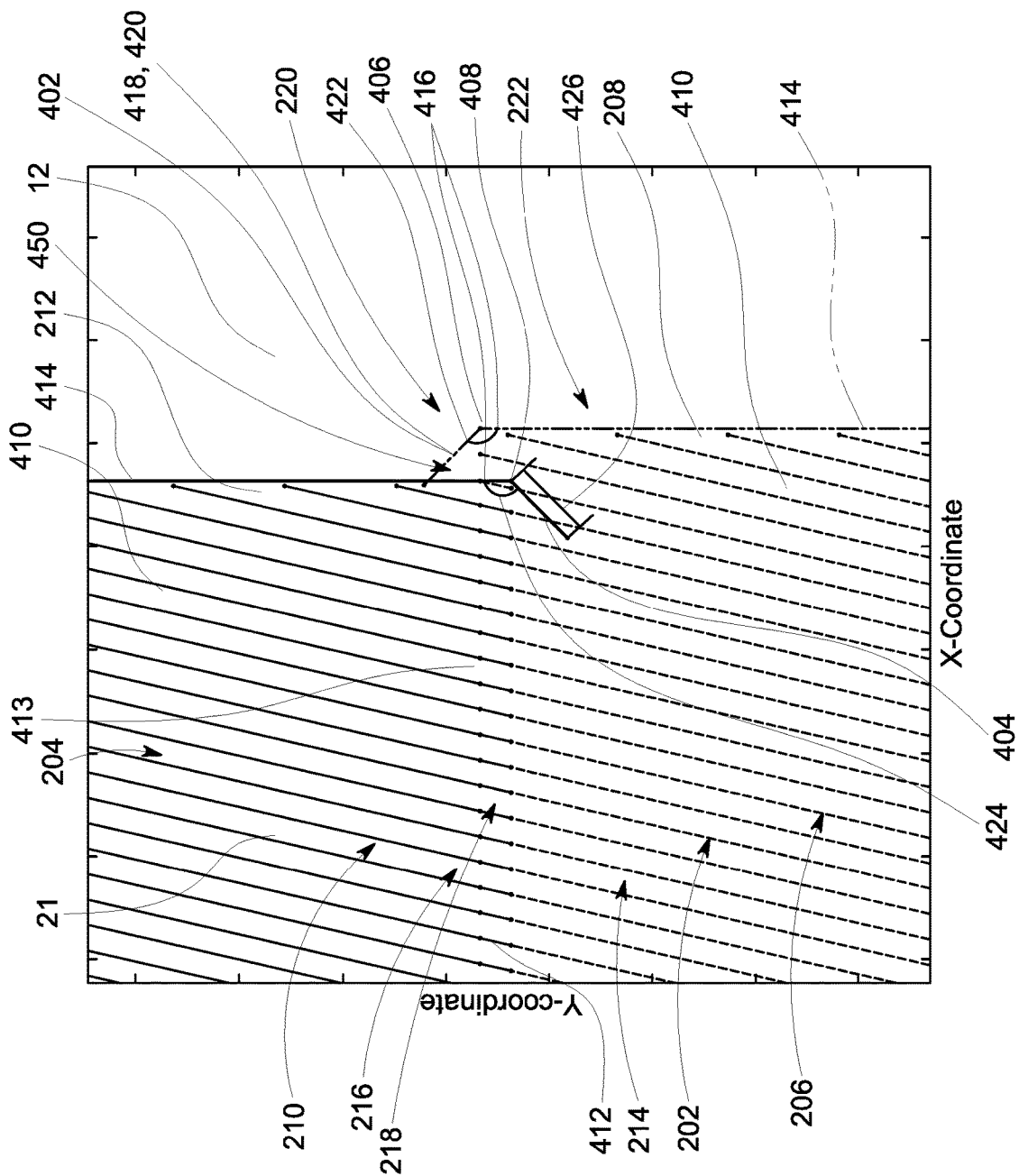
FIG. 4 is another top view of the build platform and the powdered build material shown in FIG. 1 in an x-y coordinate system.

FIG. 4 is another top view of build platform 12 and powdered build material 21 in an x-y coordinate system with at least one hook or stitch 402, 404 added to an end 406, 408 of first contour path 208 and second contour path 212. Hooks 402, 404 reduce the sharpness of step 220 and contour 222 by stitching first contour path 208 and second contour path 212 together when discontinuity 224 is created by a misalignment within contour 222 of solid component 28. As shown in FIG. 4, each first hatching path 206 and second hatching path 210 includes a main portion 410 and an overlapping extension 412 extending from main portion 410 into overlapping region 218. Each overlapping extension 412 of each first hatching path 206 and second hatching path 210 includes an end 413. Additionally, each first contour path 208 and second contour path 212 also includes a main portion 414 and an overlapping extension 416 extending from main portion 414 into overlapping region 218. Hooks 402, 404 each extend from overlapping extensions 416 of first contour path 208 and second contour path 212. More specifically, a first hook 402 extends from overlapping extension 416 of first contour path 208 into main portions 410 of second hatching path 210, and a second hook 404 extends from overlapping extension 416 of second contour path 212 into main portions 410 of first hatching path 206. Hooks 402, 404 reduce the sharpness of step 220 and contour 222 by creating a sloped surface 418 extending from end 406, 408 of first contour path 208 and/or second contour path 212 into main portions 410 of first hatching path 206 and/or second hatching path 210. Accordingly, hooks 402, 404 stitch together first contour path 208 and second contour path 212 when first contour path 208 and second contour path 212 are misaligned. Moreover, because hooks 402, 404 extend into main portions 410 of hatching paths 206, 210, hooks 402, 404 strengthen the interface between first portion 214 and second portion 216.

Hooks 402, 404 reduce the sharpness of step 220 and contour 222 by creating a ramped or curved transition between first contour path 208 and second contour path 212. As illustrated in FIG. 4, hooks 402, 404 include a straight extension 420 of first contour path 208 and/or second contour path 212 into main portions 410 of first contour path 208 and/or second hatching paths 210. A hook angle 422, 424 is formed between straight extension 420 and end 413 of overlapping extension 412 of each first hatching path 206 and/or second hatching path 210. In the exemplary embodiment, straight extension 420 of first hook 402 forms a first hook angle 422 with end 413 of overlapping extension 412 of first hatching paths 206, and straight extension 420 of second hook 404 forms a second hook angle 424 with end 413 of overlapping extension 412 of second hatching path 210.

In the exemplary embodiment, hook angles 422, 424 may include angles from about 0° to about 90°. In the illustrated embodiment, hook angles 422, 424 include angles from about 15° to about 60°. More specifically, in the illustrated embodiment, hook angles 422, 424 are 45° angles. However, hook angles 422, 424 may include any angle that enables hooks 402, 404 to operate as described herein. Hook angles 422, 424 determine a length 426 of straight extension 420 and a sharpness of hooks 402, 404. A smaller hook angle 422, 424 reduces length 426 and increases the sharpness of hooks 402, 404 as compared to larger hook angles 422, 424. More specifically, smaller hook angles 422, 424 intersect the other contour path 208, 212 closer to end 406, 408 of contour path 208, 212 than larger hook angles 422, 424, and, as such, are sharper than hooks 402, 404 with larger hook angles 422, 424. Accordingly, varying the angle of hook angles 422, 424 at least partially determines the sharpness of hooks 402, 404.

In the exemplary embodiment, laser scanning device 18 directs first laser beam 16 across build platform 12 and powdered build material 21 along first hatching paths 206, first contour path 208, and first hook 402, and laser scanning device 19 directs second laser beam 17 across build platform 12 and powdered build material 21 along second hatching paths 210, second contour path 212, and second hook 404. In the exemplary embodiment, hooks 402, 404 are added to every first contour path 208 and second contour path 212 to reduce the sharpness and/or roughness of contour 222 that may occur due to potential misalignments of laser devices 14, 15.

In an alternative embodiment, optical detector 38 detects a misalignment between laser devices 14, 15, and computing device 24 directs controller 26 to add hooks 402, 404 to first contour path 208 and second contour path 212 when a misalignment occurs. Specifically, optical detector 38 detects first contour path 208 and second contour path 212 and determines whether first contour path 208 and second contour path 212 are aligned. More specifically, optical detector 38 detects the position of melt pools created by laser beams 16, 17 when consolidating first contour path 208 and second contour path 212. In alternative embodiments, optical detector 38 detects the position of first contour path 208 and second contour path 212 using any detection method that enables optical detector 38 to operate as described herein. Computing device 24 processes the position of first contour path 208 and second contour path 212 to determine if first contour path 208 and second contour path 212 are aligned. Computing device 24 generates control signals 60 that are fed back to controller 26 and used to adjust laser scanning devices 18, 19. Laser scanning devices 18, 19 adjust first position 23 and second position 25 based on feedback from controller 26. Thus, if first contour path 208 and second contour path 212 are misaligned relative to each other, optical system 20 provides feedback to adjust the position of laser beams 16, 17 to add hooks 402, 404 to first contour path 208 and second contour path 212.

In another alternative embodiment, optical detector 38 detects a misalignment between laser devices 14, 15, and computing device 24 directs controller 26 to add one of hooks 402, 404 to first contour path 208 or second contour path 212 when a misalignment occurs. Specifically, optical detector 38 detects first contour path 208 and second contour path 212 and determines whether first contour path 208 and second contour path 212 are aligned as described above. However, rather than adding hooks 402, 404 to first contour path 208 and second contour path 212, computing device 24 processes the position of first contour path 208 and second contour path 212 to determine which contour path 208, 212 is the outer contour path and adds hooks 402, 404 only to the outer contour path. In the exemplary embodiment, first contour path 208 is the outer contour path, and only first hook 402 would be added to first contour path 208.

Figure 5:
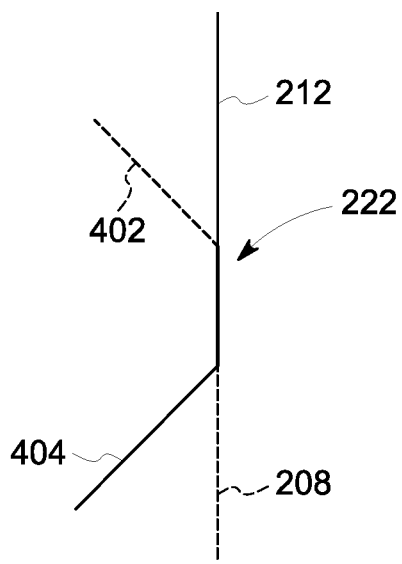
FIG. 5 is a schematic diagram of a first contour path including a first hook aligned with a second contour path including a second hook.

FIG. 5 is a schematic diagram of aligned first contour path 208 including first hook 402 and second contour path 212 including second hook 404. In the illustrated embodiment, first contour path 208 and second contour path 212 are aligned, and, as such, form a continuous, smooth contour 222. Because first contour path 208 and second contour path 212 are aligned, hooks 402, 404 extend into main portions 410 of hatching paths 206, 210 without stitching together first contour path 208 and second contour path 212. Hooks 402, 404 shown in FIGS. 4 and 5 are simple or straight hooks that are substantially linear from end 406, 408 of first contour path 208 and/or second contour path 212 to an end of hooks 402, 404.

Figure 6:
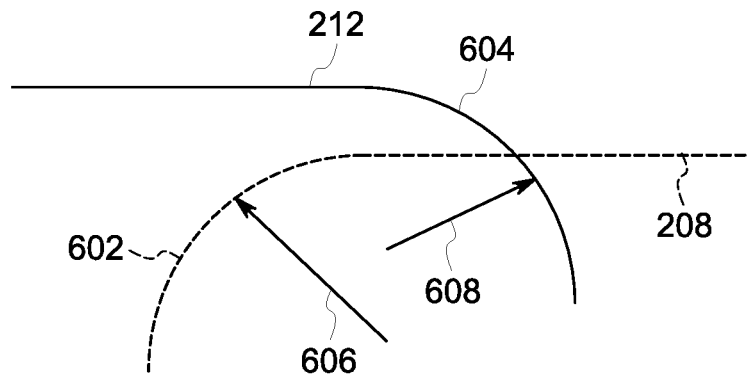
FIG. 6 is a schematic diagram of a first contour path including a first circular hook misaligned with a second contour path including a second circular hook.

FIG. 6 is a schematic diagram of misaligned first contour path 208 including a first circular hook 602 and second contour path 212 including a second circular hook 604. Circular hooks 602, 604 are circular rather than straight and form an arc of a circle. More specifically, circular hooks 602, 604 are quadrants of a circle. Because circular hooks 602, 604 are circular rather than straight, circular hooks 602, 604 reduce the sharpness and/or roughness of contour 222 more than hooks 402, 404 reduce the sharpness and/or roughness of contour 222. First circular hook 602 includes a first circular hook radius 606, and second circular hook 604 includes a second circular hook radius 608. In the exemplary embodiment, first circular hook radius 606 and second circular hook radius 608 are about 0.01 millimeters (mm) to about 1.00 mm in length. However, first circular hook radius 606 and second circular hook radius 608 may be any length that enables circular hooks 602, 604 to operate as described herein. Additionally, in the exemplary embodiment, first circular hook radius 606 and second circular hook radius 608 are equal. However, in alternative embodiments, first circular hook radius 606 and second circular hook radius 608 may be different. The circular shape of circular hooks 602, 604 enable laser beams 16, 17 to transition from contour paths 208, 212 to circular hooks 602, 604 and for the transition time to be tuned. More specifically, the probability of an undesirable change in the melt pool, such as a keyhole, due a delay in transitioning from contour paths 208, 212 to circular hooks 602, 604 is reduced because the transition time is tuned. Additionally, the probability of laser beams 16, 17 failing to follow the path of circular hooks 602, 604 due a quick transition time is reduced because the transition time is tuned.

Figure 7:
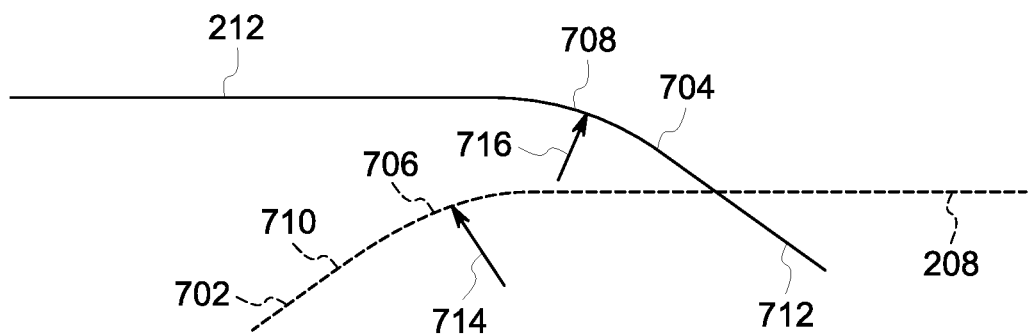
FIG. 7 is a schematic diagram of a first contour path including a first rounded hook misaligned with a second contour path including a second rounded hook.

FIG. 7 is a schematic diagram of misaligned first contour path 208 including a first rounded hook 702 and second contour path 212 including a second rounded hook 704. Rounded hooks 702, 704 include rounded portions 706, 708 extending from contour paths 208, 212 and straight portions 710, 712 extending from rounded portions 706, 708. As such, the intersection of rounded hooks 702, 704 and contour paths 208, 212 are rounded rather than straight and form an arc of a circle proximate the intersection of rounded hooks 702, 704 and contour paths 208, 212. Because rounded hooks 702, 704 are partially rounded rather than straight, rounded hooks 702, 704 reduce the sharpness and/or roughness of contour 222 more than hooks 402, 404 reduce the sharpness and/or roughness of contour 222. First rounded hook 702 includes a first straight portion 710 and a first rounded portion 706 including a first rounded hook radius 714, and second rounded hook 704 includes a second straight portion 712 and a second rounded portion 708 including a second rounded hook radius 716. In the exemplary embodiment, first rounded hook radius 714 and second rounded hook radius 716 are about 0.01 millimeters (mm) to about 0.10 mm in length. However, first rounded hook radius 714 and second rounded hook radius 716 may be any length that enables rounded hooks 702, 704 to operate as described herein. Additionally, in the exemplary embodiment, first rounded hook radius 714 and second rounded hook radius 716 are equal. However, in alternative embodiments, first rounded hook radius 714 and second rounded hook radius 716 may be different. The circular shape of rounded portions 706, 708 enable laser beams 16, 17 to transition from contour paths 208, 212 to straight portions 710, 712 and for the transition time to be tuned. More specifically, the probability of an undesirable change in the melt pool, such as a keyhole, due a delay in transitioning from contour paths 208, 212 to straight portions 710, 712 is reduced because the transition time is tuned. Additionally, the probability of laser beams 16, 17 failing to follow the path of straight portions 710, 712 due a quick transition time is reduced because the transition time is tuned.

Figure 8:
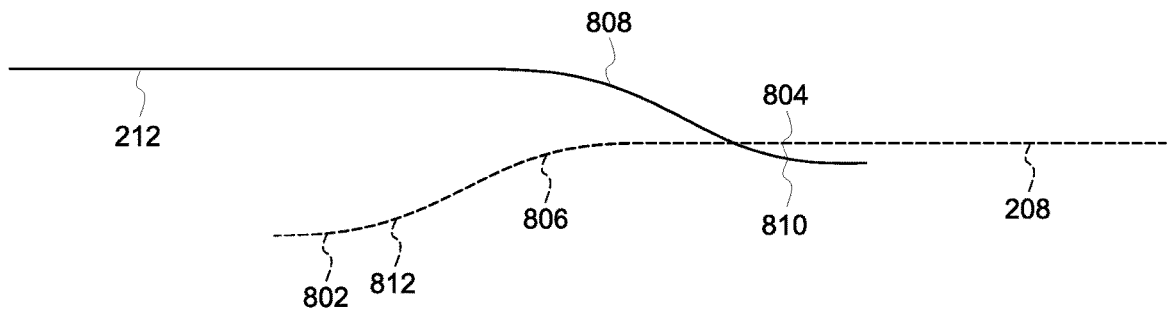
FIG. 8 is a schematic diagram of a first contour path including a first double rounded hook misaligned with a second contour path including a second double rounded hook.

FIG. 8 is a schematic diagram of misaligned first contour path 208 including a first double rounded hook 802 and second contour path 212 including a second double rounded hook 804. Double rounded hooks 802, 804 include first rounded portions 806, 808 extending from contour paths 208, 212 and second rounded portions 810, 812 extending from first rounded portions 806, 808. As such, the intersection of double rounded hooks 802, 804 and contour paths 208, 212 are rounded rather than straight and form an arc of a circle proximate the intersection of double rounded hooks 802, 804 and contour paths 208, 212. Additionally, the ends of double rounded hooks 802, 804 are rounded rather than straight and form an arc of a circle proximate the end of double rounded hooks 802, 804. Because double rounded hooks 802, 804 are rounded rather than straight, double rounded hooks 802, 804 reduce the sharpness and/or roughness of contour 222 more than hooks 402, 404 reduce the sharpness and/or roughness of contour 222. First double rounded hook 802 includes a first rounded portion 806 and a second rounded portion 810, and second double rounded hook 804 includes a first rounded portion 808 and a second rounded portion 812.

Figure 9:
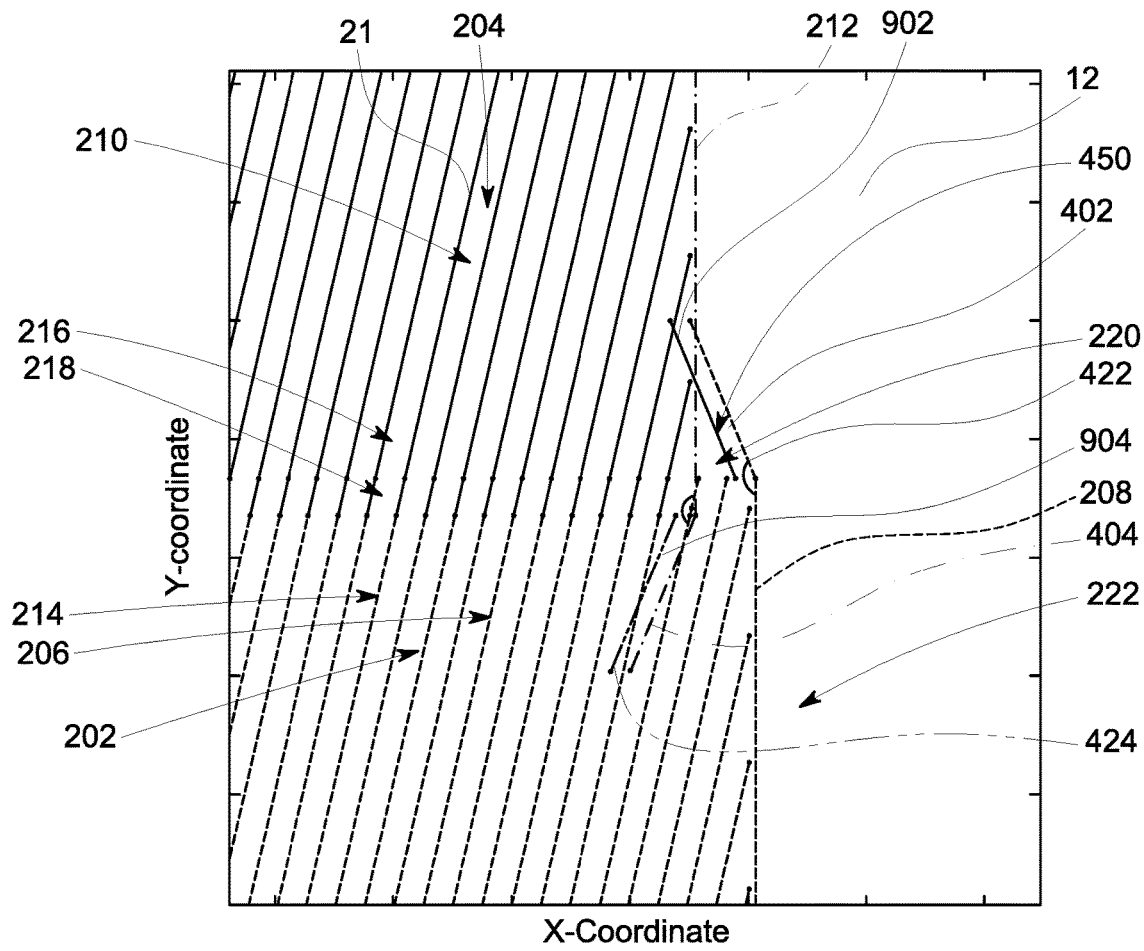
FIG. 9 is another top view of the build platform and the powdered build material shown in FIG. 1 in an x-y coordinate system.

FIG. 9 is another top view of build platform 12 and powdered build material 21 in an x-y coordinate system with hooks 402, 404 added to end 406, 408 of first contour path 208 and second contour path 212 and at least one inset hook 902, 904 added to prevent subsurface porosity. As shown in FIG. 4, misalignment between first contour path 208 and second contour path 212 causes first hook 402, second contour path 212, and first hatching paths 206 to define a void 450 therebetween. Void 450 may cause defects within solid component 28 because void 450 may cause subsurface porosity. In order to reduce and/or eliminate void 450, at least one inset hook 902, 904 may be added inset from hooks 402, 404. More specifically, inset hooks 902, 904 have the same hook angles 422, 424, length 426, and shape as hooks 402, 404, but are located inset, or positioned closer to hatching paths 206, 210 than hooks 402, 404. Accordingly, a path of inset hooks 902, 904 extend over void 450 and eliminate void 450, reducing and/or eliminating subsurface porosity caused by hooks 402, 404.

In the exemplary embodiment, a first inset hook 902 is positioned inset from first hook 402, and a second inset hook 904 is positioned inset from second hook 404. However, in an alternative embodiment, rather than adding inset hook 902, 904 inset from both hooks 402, 404, computing device 24 processes the position of first contour path 208 and second contour path 212 to determine which contour path 208, 212 is the outer contour path and adds inset hooks 902, 904 only to the outer contour path. In the exemplary embodiment, first contour path 208 is the outer contour path, and only first inset hook 902 would be added inset from first hook 402. Second inset hook 904 is not required because first hatching paths 206 prevent void 450 from forming inset of second hook 404.

Figure 10A:
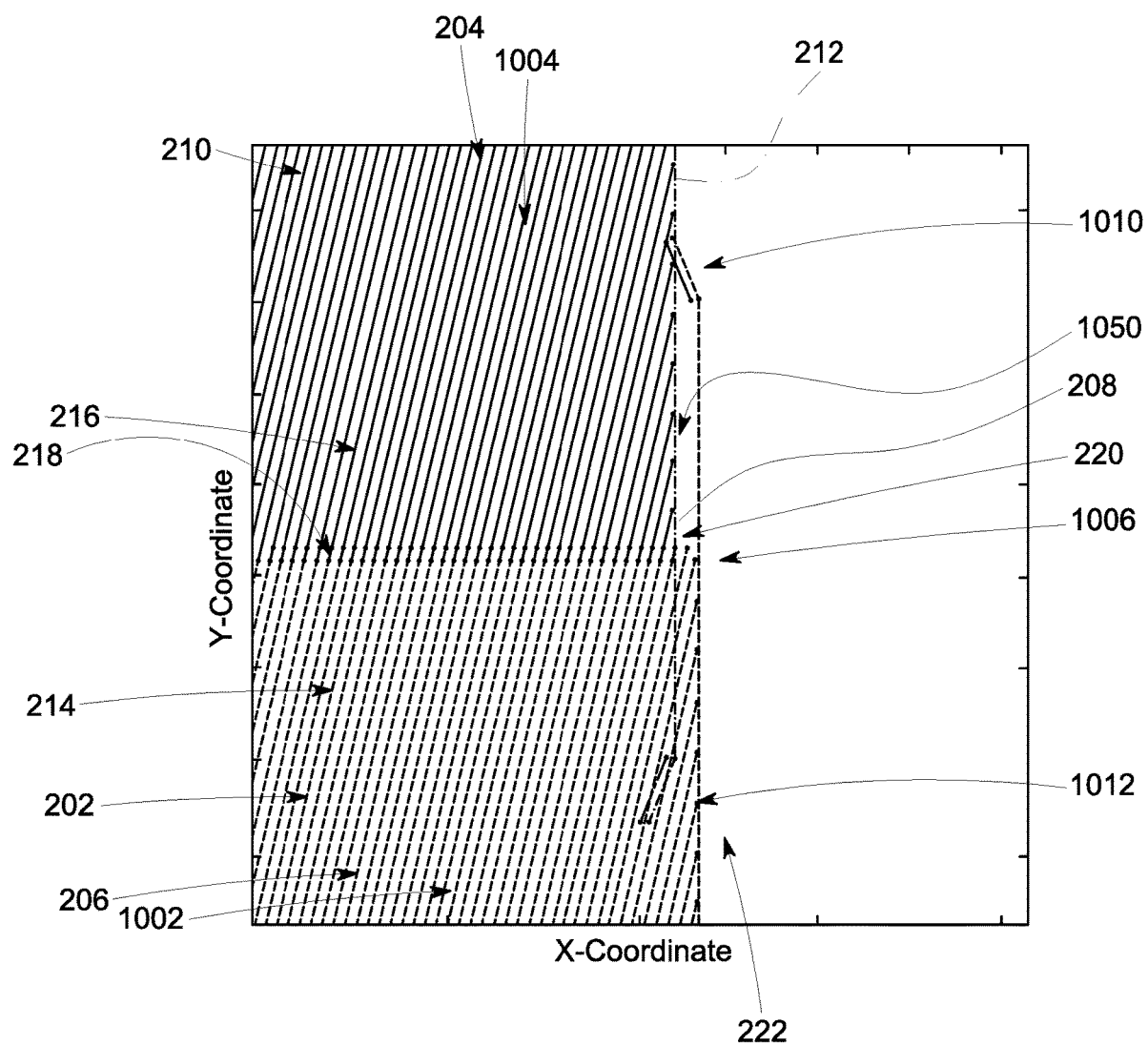
FIG. 10A is another top view of the build platform and the powdered build material shown in FIG. 1 in an x-y coordinate system.
Figure 10B:
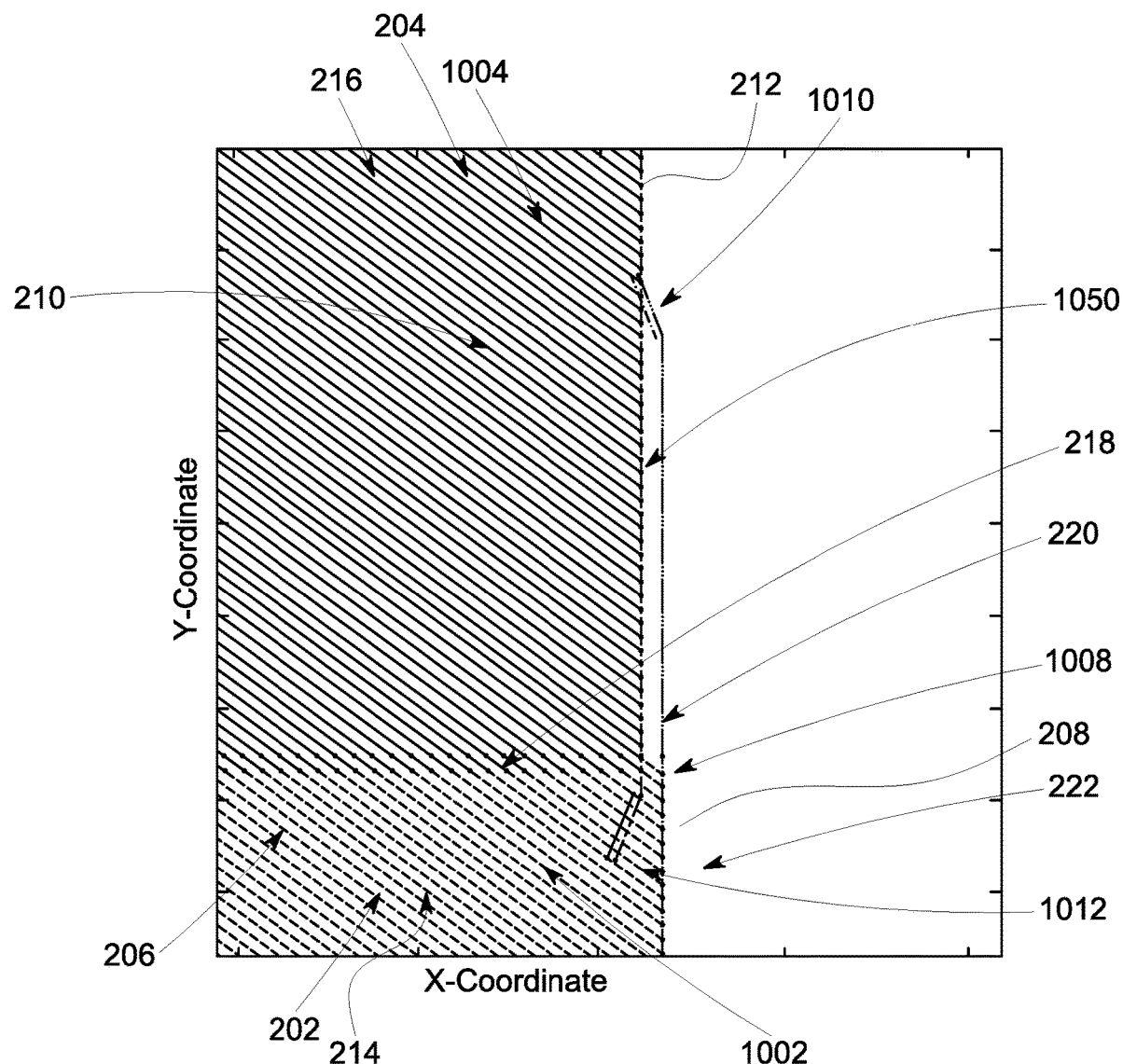
FIG. 10B is another top view of the build platform and the powdered build material shown in FIG. 1 in an x-y coordinate system.

FIG. 10A is another top view of a first layer 1002 of powdered build material 21 in an x-y coordinate system. FIG. 10B is another top view of a second layer 1004 of powdered build material 21 in an x-y coordinate system. As shown in FIGS. 10A and 10B, a misalignment of first portion 214 and second portion 216 of solid component 28 occurs at a first location 1006 within first layer 1002, and a misalignment of first portion 214 and second portion 216 of solid component 28 occurs at a second location 1008 within second layer 1004. If hooks 402, 404 were added to contour paths 208, 212 proximate to first location 1006 and second location 1008, then the location of hooks 402, 404 would change with the location of the misalignment. Rather, as shown in FIGS. 10A and 10B, hooks 402, 404 are located at a third location 1010 and a fourth location 1012 that are constant between successive layers of powdered build material 21. Keeping third location 1010 and fourth location 1012 constant between successive layers of powdered build material 21 maintains the location of the stitch in the z-direction and reduces the sharpness and/or roughness of contour 222. That is, if third location 1010 and fourth location 1012 varied with first location 1006 and second location 1008, the location of the stitch would also vary between successive layers of powdered build material 21, which would increase the sharpness and/or roughness of contour 222 in the z-direction.

Maintaining a constant third location 1010 and fourth location 1012 between successive layers of powdered build material 21 maintains a constant stitch location in the z-direction and reduces the sharpness and/or roughness of contour 222 in the z-direction. As shown in FIGS. 10A and 10B, third location 1010 and fourth location 1012 are maintained in a constant location by extending overlapping extension 416 such that the location of hooks 402, 404 are maintained at constant third and fourth locations 1010, 1012.

Figure 11:
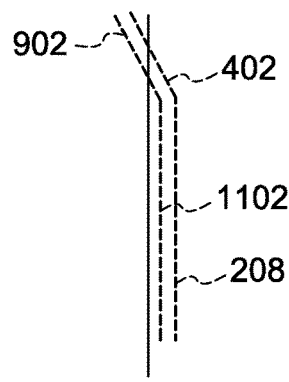
FIG. 11 is a schematic diagram of a first contour path including a first hook, a first inset hook, and a first inset hook overlapping extension.

FIG. 11 is a schematic diagram of misaligned first contour path 208 including first hook 402, first inset hook 902, and a first inset hook overlapping extension 1102 added to prevent subsurface porosity. As shown in FIGS. 10A and 10B, misalignment between first contour path 208 and second contour path 212 causes overlapping extension 416, second contour path 212, and first hatching paths 206 to define a void 1050 therebetween. Void 1050 may cause defects within solid component 28 because void 1050 may cause subsurface porosity. In order to reduce and/or eliminate void 1050, first inset hook overlapping extension 1102 may be added inset from overlapping extension 416. More specifically, first inset hook overlapping extension 1102 is located inset, or positioned closer to second hatching paths 210 than overlapping extension 416. Accordingly, a path of first inset hook overlapping extension 1102 extends over void 1050 and eliminates void 1050, reducing and/or eliminating subsurface porosity caused by overlapping extension 416.

Figure 12:
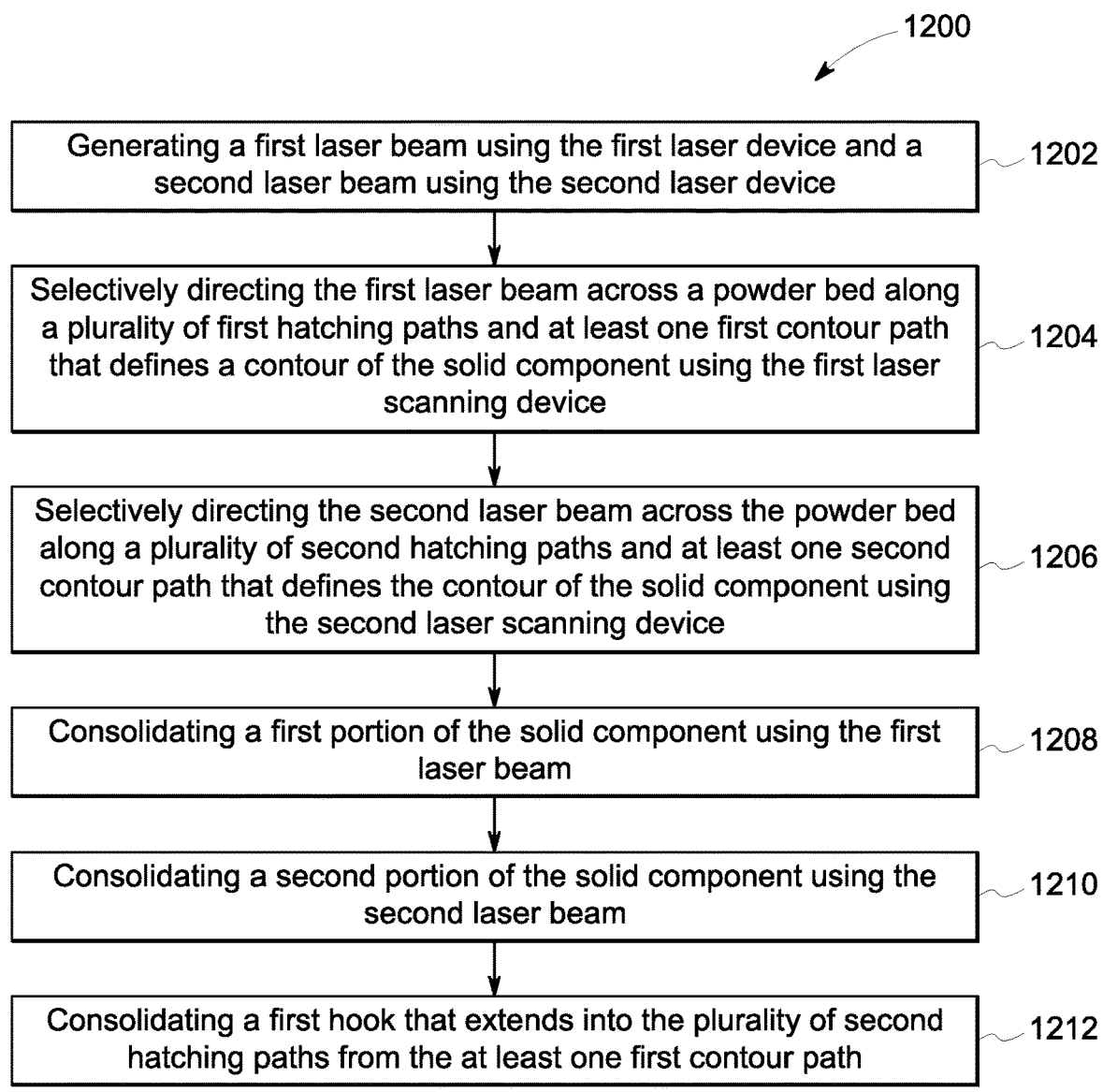
FIG. 12 is a flow diagram of a method for manufacturing a solid component with an additive manufacturing system.

FIG. 12 is a flow diagram of a method 1200 for manufacturing a solid component with an additive manufacturing system. The additive manufacturing system includes at least two laser devices and at least two laser scanning devices. The at least two laser devices include a first laser device and a second laser device. The at least two laser scanning devices include a first laser scanning device and a second laser scanning device. The method includes generating 1202 a first laser beam using the first laser device and a second laser beam using the second laser device. The method also includes selectively directing 1204 the first laser beam across a powder bed along a plurality of first hatching paths and at least one first contour path that defines a contour of the solid component using the first laser scanning device. The method further includes selectively directing 1206 the second laser beam across the powder bed along a plurality of second hatching paths and at least one second contour path that defines the contour of the solid component using the second laser scanning device. The method also includes consolidating 1208 a first portion of the solid component using the first laser beam. The method further includes consolidating 1210 a second portion of the solid component using the second laser beam. The method also includes consolidating 1212 a first hook that extends into the plurality of second hatching paths from the at least one first contour path.

Embodiments of the additive manufacturing systems described herein add hooks to the end of contour paths to reduce the roughness of a contour of a solid component. The additive manufacturing system includes at least two laser devices and at least two laser scanning devices. The laser devices include a first laser device configured to generate a first laser beam and a second laser device configured to generate a second laser beam. The first laser beam is configured to consolidate a first portion of a solid component, and the second laser beam is configured to consolidate a second portion of the solid component. The laser scanning devices include a first laser scanning device and a second laser scanning device. The first laser scanning device is configured to selectively direct the first laser beam from the first laser devices across a powder bed along a plurality of first hatching paths and a first contour path along a contour of the solid component. The second laser scanning device is configured to selectively direct the second laser beam from the second laser devices across the powder bed along a plurality of second hatching paths and at least one second contour path along the contour of the solid component. When the scanning devices become misaligned, the first contour path and the second contour path also become misaligned, creating a discontinuity on a surface of the solid component. The discontinuity causes roughness on the surface of the solid component. A hook is added to the end of the first and second contour paths in order to reduce the roughness cause by misalignment of the scanning devices and/or laser beams. The hooks extend from the end of the contour paths at an angle into the hatching paths to reduce the roughness of the discontinuity. Accordingly, the hooks stitch together misaligned contour paths and reduce the roughness and/or sharpness of the surface of the solid component.

An exemplary technical effect of the methods and systems described herein includes: (a) consolidating a hook at the end of a contour path; (b) reducing the roughness of a contour of a solid component; and (c) reducing defects in a solid component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   at least two laser devices comprising:
      a first laser device configured to generate a first laser beam for consolidating a first portion of a solid component; and
      a second laser device configured to generate a second laser beam for consolidating a second portion of the solid component; and
   at least two laser scanning devices comprising:
      a first laser scanning device configured to selectively direct the first laser beam across a powder bed along a plurality of first hatching paths and at least one first contour path that defines a contour of the solid component; and
      a second laser scanning device configured to selectively direct the second laser beam across the powder bed along a plurality of second hatching paths and at least one second contour path that defines the contour of the solid component; and
   a controller configured to control the operation of the first laser scanning device and the second laser scanning device, wherein the controller is programmed to direct the first laser beam across the at least one first contour path, and wherein the at least one first contour path includes a first hook extending into the plurality of second hatching paths.

2. The additive manufacturing system in accordance with claim 1, wherein the controller is further programmed to direct the second laser beam across the at least one second contour path, and wherein the at least one second contour path includes a second hook extending into the plurality of first hatching paths.

3. The additive manufacturing system in accordance with claim 1, wherein the plurality of first hatching paths at least partially overlap the plurality of second hatching paths.

4. The additive manufacturing system in accordance with claim 1, wherein the at least one first contour path at least partially overlaps the at least one second contour path.

5. The additive manufacturing system in accordance with claim 4, wherein the at least one first contour path and the at least one second contour path are at least partially misaligned.

6. The additive manufacturing system in accordance with claim 1, wherein the at least one first contour path further includes a first inset hook extending into the plurality of second hatching paths and inset from the first hook.

7. The additive manufacturing system in accordance with claim 1, wherein the at least one second contour path includes a second hook extending into the plurality of first hatching paths, and wherein the at least one second contour path includes a second inset hook extending into the plurality of first hatching paths and inset from the second hook.

8. The additive manufacturing system in accordance with claim 1, wherein a location of the first hook remains the same between successive layers of a powdered build material spread across the powder bed.

9. The additive manufacturing system in accordance with claim 8, wherein the at least one first contour path further includes a first hook overlapping extension that maintains the location of the first hook between successive layers of the powdered build material spread across the powder bed.

10. The additive manufacturing system in accordance with claim 9, wherein the at least one first contour path further includes a first inset hook extending into the plurality of second hatching paths, wherein the first inset hook is inset from the first hook and corresponds to the location of the first hook, and wherein the location of the first inset hook is maintained between successive layers by extending a first inset hook overlapping extension inset between the at least one first contour path and the first inset hook.

\* \* \* \* \*